(12) United States Patent
Devine et al.

(10) Patent No.: US 10,431,409 B2
(45) Date of Patent: Oct. 1, 2019

(54) ELECTRICAL SWITCHING APPARATUS AND ACCESSORY WIRE RETENTION ASSEMBLY THEREFOR

(71) Applicant: EATON CORPORATION, Cleveland, OH (US)

(72) Inventors: Jack Devine, Pittsburgh, PA (US); Brian Scott Jansto, Beaver Falls, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 150 days.

(21) Appl. No.: 15/671,279

(22) Filed: Aug. 8, 2017

(65) Prior Publication Data

US 2019/0051482 A1    Feb. 14, 2019

(51) Int. Cl.
| | |
|---|---|
| *H01H 13/04* | (2006.01) |
| *H01H 71/02* | (2006.01) |
| *H01H 71/10* | (2006.01) |
| *H01H 9/02* | (2006.01) |
| *H01H 9/08* | (2006.01) |
| *H02B 11/04* | (2006.01) |

(52) U.S. Cl.
CPC .......... *H01H 71/0228* (2013.01); *H01H 9/02* (2013.01); *H01H 9/085* (2013.01); *H01H 71/0214* (2013.01); *H01H 71/1009* (2013.01); *H02B 11/04* (2013.01); *H01H 2071/0278* (2013.01); *H01H 2071/0292* (2013.01)

(58) Field of Classification Search
CPC ................................. H01H 13/04; H01H 9/02
USPC ........................................................ 335/202
See application file for complete search history.

(56) References Cited

U.S. PATENT DOCUMENTS

| | | |
|---|---|---|
| 4,408,174 A | 10/1983 | Seymour et al. |
| 7,800,468 B2 | 9/2010 | Bogdon et al. |
| 9,443,686 B2 | 9/2016 | Whitaker et al. |

(Continued)

FOREIGN PATENT DOCUMENTS

| | | |
|---|---|---|
| DE | 4408234 C1 | 6/1995 |
| DE | 102013209773 A1 | 11/2014 |

(Continued)

OTHER PUBLICATIONS

European Patent Office "Extended European Search Report", from corresponding EP 18187155.9, dated Feb. 28, 2019, 9 pp.

*Primary Examiner* — Shawki S Ismail
*Assistant Examiner* — Lisa N Homza
(74) *Attorney, Agent, or Firm* — Eckert Seamans Cherin & Mellott, LLC (57) ABSTRACT

An accessory wire retention assembly is for an electrical switching apparatus, such as a circuit breaker. The circuit breaker comprises a housing, separable contacts and an accessory enclosed by the housing, an operating mechanism for opening and closing the separable contacts, and a number of wires adapted to be electrically connected to the accessory. The wires extend from the interior of the housing through an aperture to the exterior. The accessory wire retention assembly includes an insert which cooperates with the housing and to establish a predetermined position of the wires with respect to the accessory and the aperture, and a fastening mechanism which fastens the wires to the insert to maintain the wires in the predetermined position.

16 Claims, 5 Drawing Sheets

(56) References Cited

U.S. PATENT DOCUMENTS

| | | | | |
|---|---|---|---|---|
| 2004/0056745 | A1* | 3/2004 | Watanabe | G06F 3/016 |
| | | | | 335/220 |
| 2011/0140818 | A1* | 6/2011 | Hatanaka | G05G 5/05 |
| | | | | 335/219 |
| 2016/0077590 | A1* | 3/2016 | Tachiiri | G06F 3/0354 |
| | | | | 345/184 |
| 2016/0195937 | A1* | 7/2016 | Tachiiri | G05G 9/047 |
| | | | | 345/157 |
| 2016/0259429 | A1* | 9/2016 | Hisatsugu | G06F 3/0338 |
| 2016/0328018 | A1* | 11/2016 | Hisatsugu | G06F 3/016 |
| 2017/0032915 | A1* | 2/2017 | Hatanaka | B60K 35/00 |
| 2017/0060271 | A1* | 3/2017 | Hisatsugu | H02K 41/031 |
| 2017/0300135 | A1* | 10/2017 | Hisatsugu | H02K 41/031 |
| 2017/0358415 | A1* | 12/2017 | Hatanaka | H01H 50/18 |
| 2018/0004315 | A1* | 1/2018 | Hatanaka | G06F 3/0354 |
| 2018/0240630 | A1* | 8/2018 | Kozai | H01H 50/14 |
| 2018/0269017 | A1* | 9/2018 | Konishi | H01H 51/29 |
| 2018/0277324 | A1* | 9/2018 | Kobayashi | H01H 50/36 |
| 2018/0350542 | A1* | 12/2018 | Tanaka | H01H 50/02 |

FOREIGN PATENT DOCUMENTS

| | | | |
|---|---|---|---|
| FR | 2994346 | A1 | 2/2014 |
| JP | S6212240 | U | 1/1987 |
| JP | 10-12118 | A | 1/1998 |

* cited by examiner

ELECTRICAL SWITCHING APPARATUS AND ACCESSORY WIRE RETENTION ASSEMBLY THEREFOR

BACKGROUND

Field

The disclosed concept relates generally to electrical switching apparatus and, more particularly, to electric switching apparatus, such as for example, circuit breakers. The disclosed concept also relates to accessory wire retention assemblies for circuit breakers.

Background Information

Electrical switching apparatus, such as circuit breakers, as well as transfer switches, network protectors and the like, are often equipped with components or accessories such as, for example and without limitation, printed circuit boards (PCB's), trip actuator assemblies, auxiliary switches, shunt trip devices, under voltage release devices, and bell alarms. Such devices can be employed in a variety of ways to provide signals indicating certain conditions within the apparatus and/or to initiate a change in status of the apparatus such as, for example, to trip open the separable contacts of the apparatus in response to an electrical fault condition (e.g., without limitation, current overload; short circuit; abnormal voltage).

Some accessories include electrical conductors (e.g., wires). Available space within the circuit breaker housing for mounting accessories and routing the corresponding wires is limited. Wires must also be routed properly to avoid interference with internal circuit breaker components and to comply with agency code requirements, for example, with respect clearance and strain relief regulations.

There is room for improvement in electrical switching apparatus, and in wire retention assemblies therefor.

SUMMARY

These needs and others are met by embodiments of the invention, which are directed to an accessory wire retention assembly for an electrical switching apparatus.

As one aspect of the disclosed concept, an accessory wire retention assembly is provided for an electrical switching apparatus. The electrical switching apparatus comprises a housing, separable contacts and an accessory enclosed by the housing, an operating mechanism for opening and closing the separable contacts, and a number of wires adapted to be electrically connected to the accessory. The housing includes an interior, an exterior, and an aperture. The wires extend from the interior through the aperture to the exterior. The accessory wire retention assembly comprises: an insert structured to cooperate with the housing and to establish a predetermined position of the wires with respect to the accessory and the aperture; and a fastening mechanism structured to fasten the wires to the insert to maintain the wires in the predetermined position.

The insert may be an elongated molded member comprising a number of molded features structured to cooperate with the housing, the wires, and the fastening mechanism. The molded features may include a fastening portion for receiving the fastening mechanism and maintaining the position of the fastening mechanism.

The housing may further include a base and a cover coupled to the base, wherein the aperture extends through the base. The molded features may include a guide portion structured to cooperate with the base to accurately position the insert and the wires proximate the accessary and the aperture.

The molded features may further include a locking portion, wherein the locking portion is structured to cooperate with the cover to lock the insert in position when the cover is installed on the base.

The molded features may include a thru hole extending through the elongated molded member, wherein the thru hole is structured to receive the wires and position the wires in the predetermined position with respect to the accessory.

An electrical switching apparatus employing the aforementioned accessory wire retention assembly is also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, front, back, top, bottom and derivatives thereof, relate to the orientation of the elements shown in the drawings and are not limiting upon the claims unless expressly recited therein. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the singular form of "a", "an", and "the" include plural references unless the context clearly dictates otherwise. Still further, as used herein, the term "number" shall mean one or an integer greater than one (e.g., a plurality).

As employed herein, the term "coupled" shall mean that two or more parts are joined together directly or joined through one or more intermediate parts. Furthermore, as employed herein, the phrase "directly connected" shall mean that two or more parts are joined together directly, without any intermediate parts being disposed therebetween at the point or location of the connection.

As employed herein, the phrase "electrically connected" shall mean that two or more parts or components are joined together either directly or joined through one or more intermediate parts such that electricity, current, voltage, and/or energy is operable to flow from one part or component to the other part or component, and vice versa.

As employed herein, the term "accessory" refers to any known or suitable component or feature of an electrical switching apparatus and expressly includes, but is not limited to, printed circuit boards (PCB's), trip actuators, auxiliary switches, shunt trip devices, under voltage release devices, and bell alarms.

Figure 1:
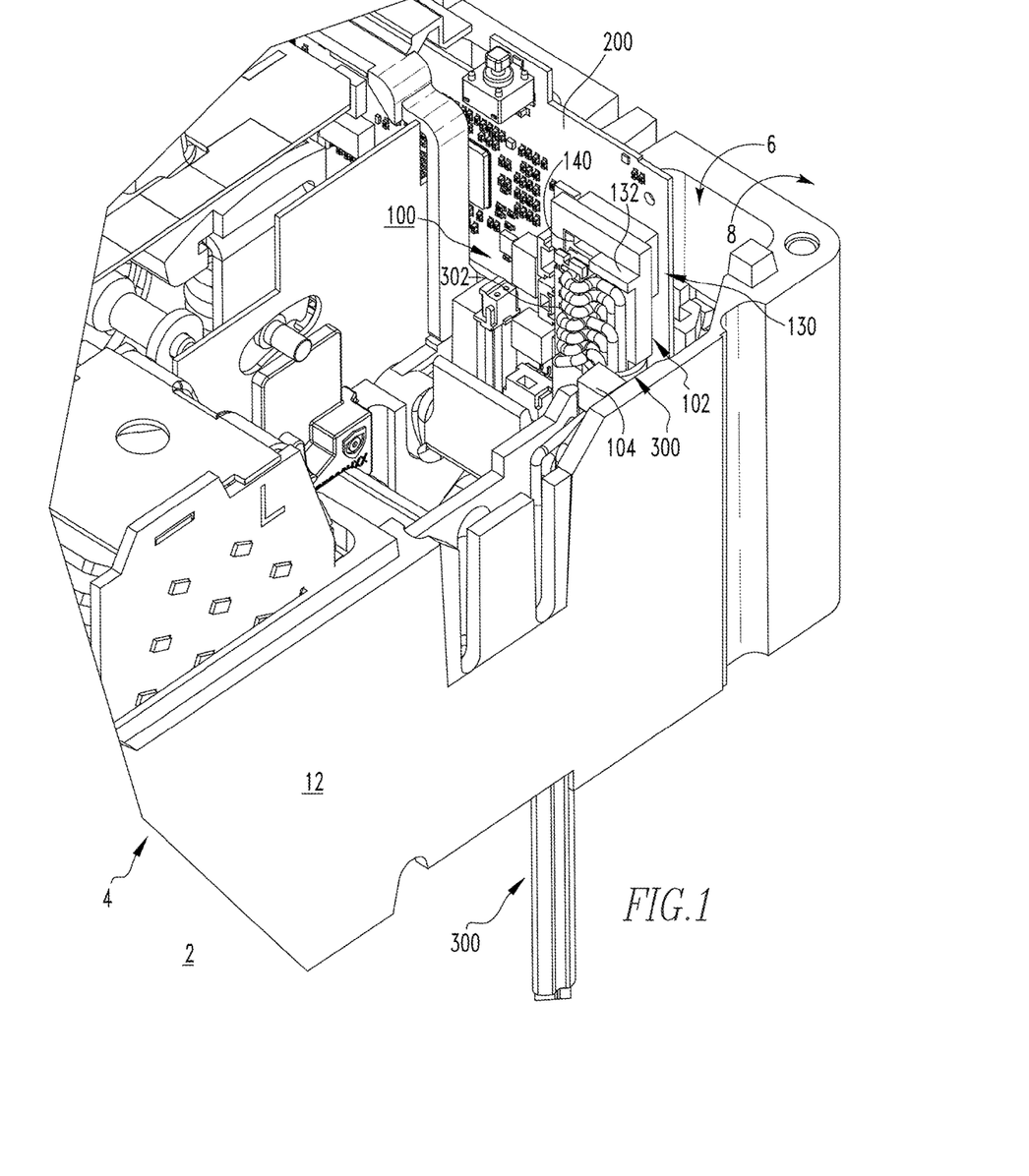
FIG. 1 is a top isometric view of a portion of an electrical switching apparatus and accessory wire retention assembly therefor, in accordance with a non-limiting embodiment of the disclosed concept.
Figure 2:
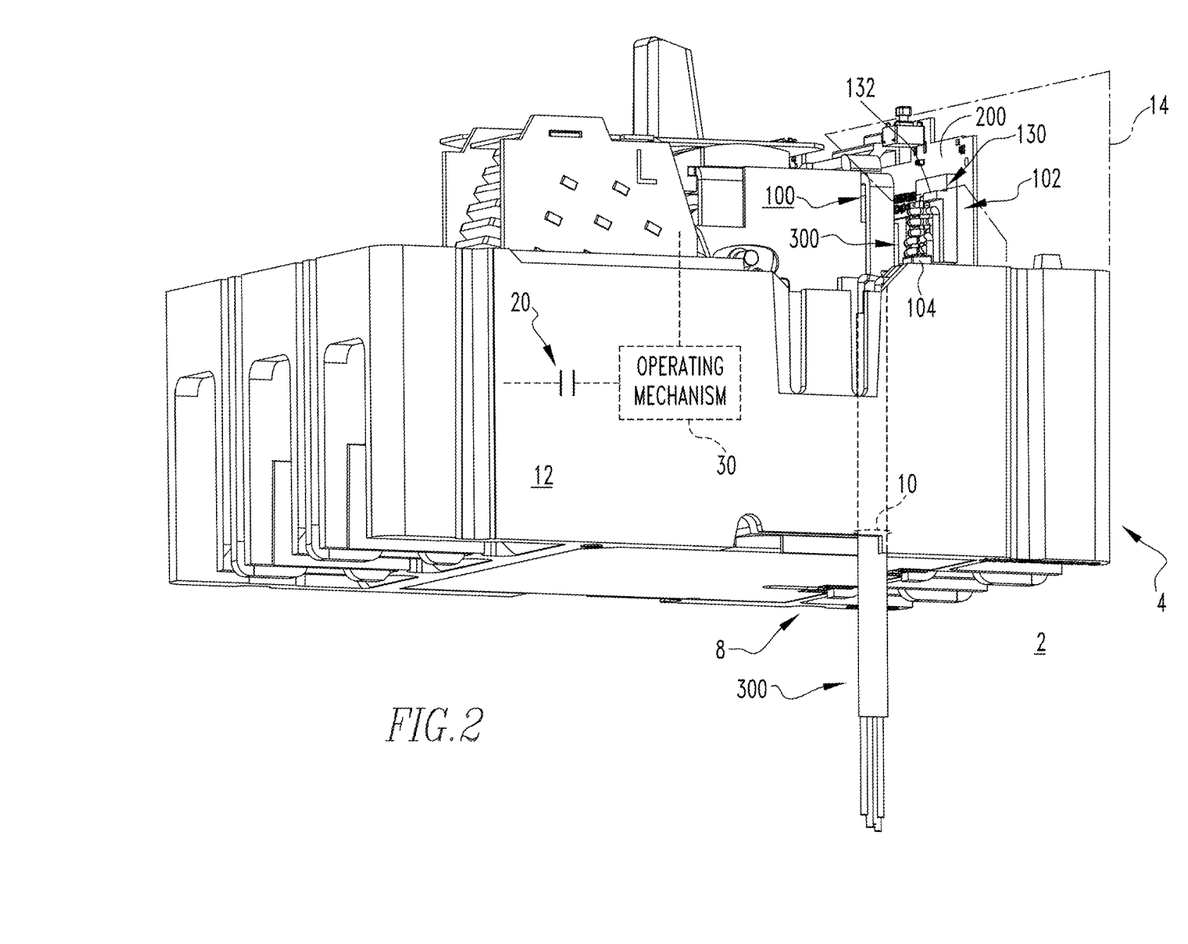
FIG. 2 is a bottom isometric view of the electrical switching apparatus and accessory wire retention assembly therefore of FIG. 1, with certain features shown in hidden or phantom line drawing in simplified form.

FIGS. 1 and 2 show an accessory wire retention assembly 100 for an electrical switching apparatus 2 (e.g., without limitation, a circuit breaker), in accordance with a non-limiting embodiment of the disclosed concept. In the example shown and described herein, the circuit breaker 2 includes a housing 4, separable contacts 20 (shown in simplified form in FIG. 2) and an accessory 200 (e.g., without limitation, printed circuit board (PCB)) enclosed by the housing 4. An operating mechanism 30 (shown in simplified form in hidden line drawing in FIG. 2) is provided for opening and closing the separable contacts 20 (FIG. 2). A number of wires 300 are adapted to be electrically connected to the accessory 200 and, in the example shown and described herein, extend from the interior 6 of the housing 4 through an aperture 10 (shown in simplified form in hidden line drawing in FIG. 2) to the exterior 8 of the housing 4, as best shown in FIG. 2. In the example shown and described, the accessory retention member 100 secures and positions a plurality of wires 300, which are bundled together and extend through the aperture 10 (FIG. 2) and which are electrically connected to an electrical connector 302 (best shown in FIGS. 1, 5 and 6). It will be appreciated, however, that any known or suitable alternative number and/or configuration of wires 300 could be employed, without departing from the scope of the disclosed concept. It will further be appreciated that the accessory wire retention assembly 100 of the disclosed concept could be employed with a wide variety of different accessories (not shown) or electrical components (not shown) other than the example PCB 200.

Figure 3:
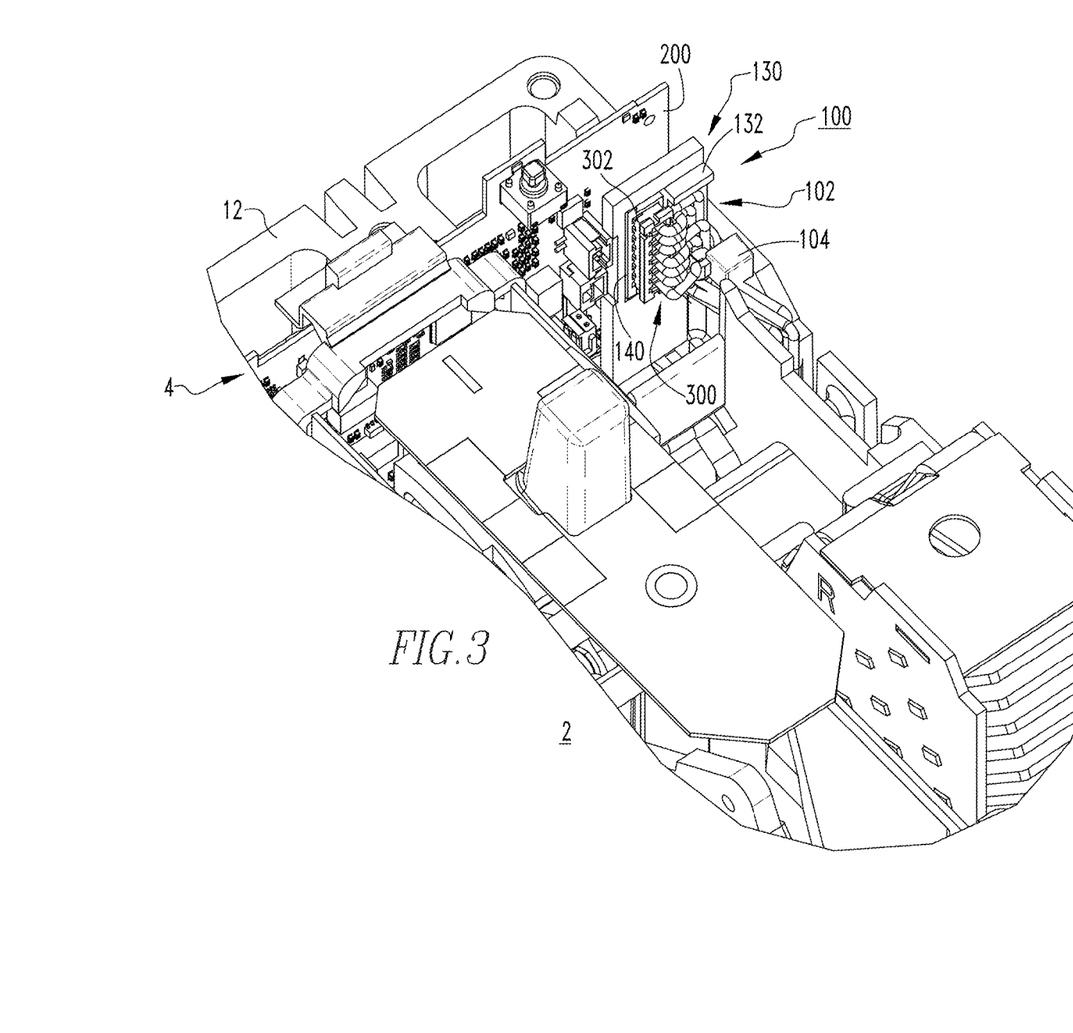
FIG. 3 is a top front isometric view of a portion of the electrical switching apparatus and accessory wire retention assembly therefor of FIG. 2.
Figure 4:
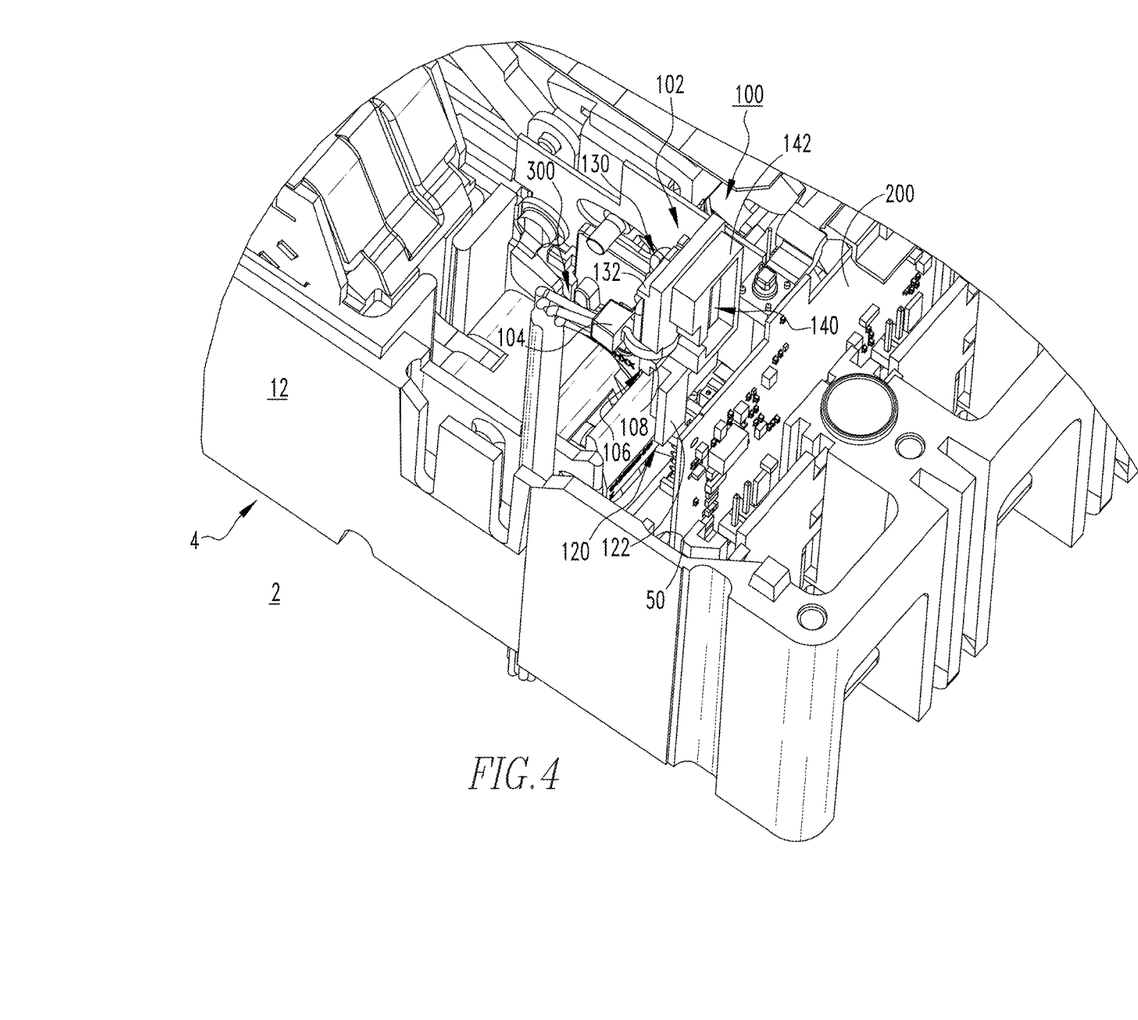
FIG. 4 is a partially exploded top back isometric view of the portion of the electrical switching apparatus and accessory wire retention assembly therefor of FIG. 3.
Figures 5, 6, 7:
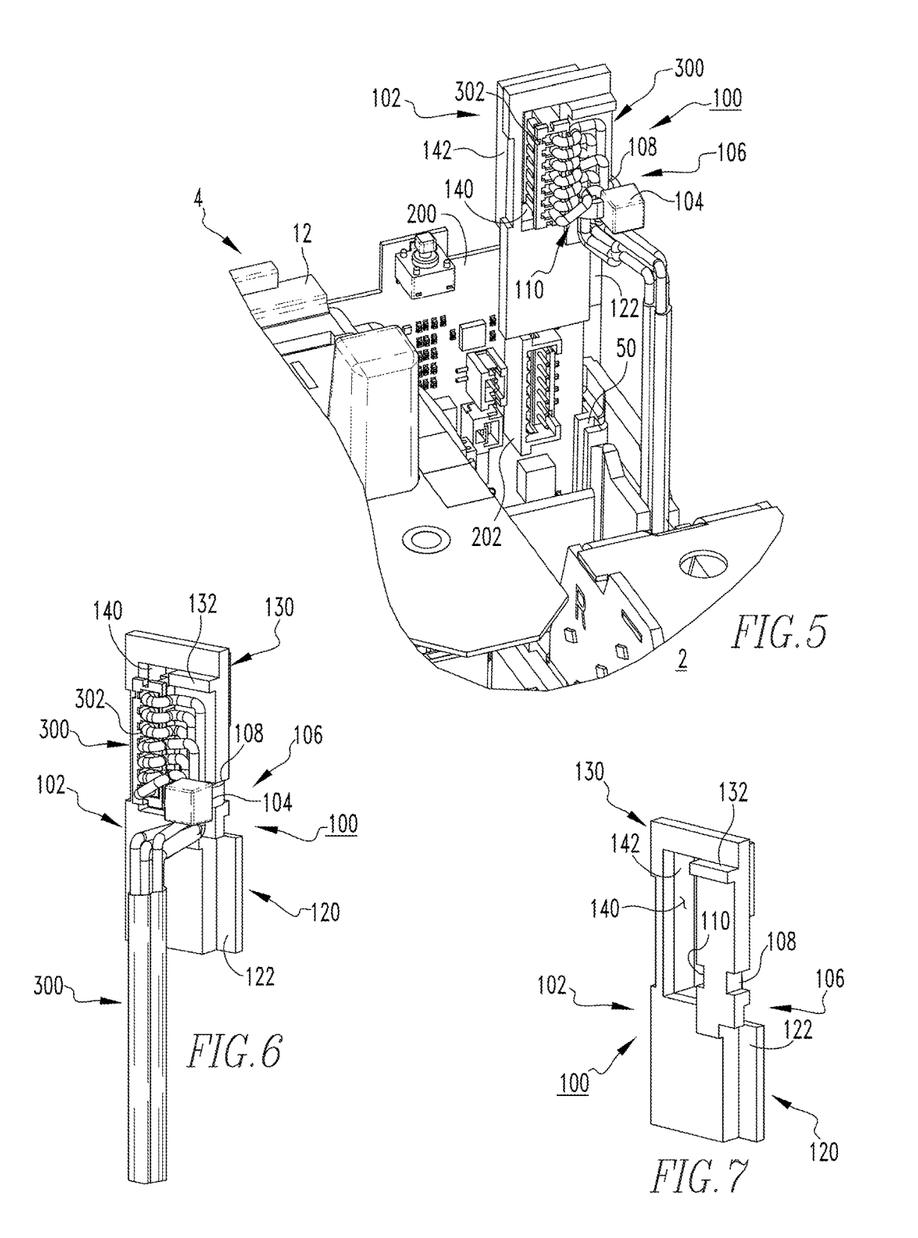
FIG. 5 is a partially exploded top front isometric view of the portion of the electrical switching apparatus and accessory wire retention assembly therefor of FIG. 4.
FIG. 6 is an isometric view of the accessory wire retention assembly of FIG. 5, shown securely retaining accessory wires.
FIG. 7 is an isometric view of a portion of the accessory wire retention assembly of FIG. 6, shown without accessory wires.

Continuing to refer to FIGS. 1 and 2, as well as FIGS. 3-5, it will be appreciated that the example accessory wire retention assembly 100 includes an insert 102, which is structured to cooperate with the circuit breaker housing 4, and to establish the desired predetermined position of the wires 300 with respect to the accessory 200 as well as with respect to the aperture 10 of the circuit breaker housing 4. The accessory wire retention assembly 100 further includes a fastening mechanism 104 structured to fasten the wires 300 to the insert 102 to maintain the wires 300 in the desired predetermined position. In this manner, the accessory wire retention assembly 100 allows multiple customer accessory wires 300 to be accurately positioned and routed within the interior 6 of the circuit breaker housing 4. Additionally, among other benefits, the insert 102 functions to transfer any localized pulling force on the wires 300 to the base 12 of the circuit breaker housing 4, in order that such pulling forces are not undesirably transmitted to the corresponding accessory 200. Establishing and maintaining accurate positioning and routing of the accessory wires 300 also minimizes the possibility of the wires 300 interfering with internal moving mechanical parts of the circuit breaker 2.

As best shown in FIGS. 5-7, the insert 102 of the example accessory wire retention assembly 100 is an elongated molder member 102 having a number of molded features 106,108,110,120,122,130,132,140,142. As will be discussed, the molded features 106,108,110,120,122,130,132, 140,142 are structured to cooperate with the housing 4, the wires 300, and the fastening mechanism 104 to establish and maintain the aforementioned desired predetermined wire position. The molded features include a fastening portion 106 for receiving the fastening mechanism 104 and maintaining the position of the fastening mechanism 104, as shown for example in FIG. 6. The fastening portion 106 preferably comprises a number of notches 108,110 (two are shown in FIG. 7) formed in the elongated molded member 102. The fastening mechanism 104 in the non-limiting example shown and described herein is a wire tie 104. As shown in FIG. 6, the wire tie 104 wraps around the wires 300 with the elongated strap portion of the wire tie 104 being disposed in the molded notches 108,110. In this manner, the location of the wire tie 104 is securely fixed with respect to the insert 102. This, in turn, resists undesired movement of the wires 300.

The example circuit breaker 2 is a molded case circuit breaker having a base 12 and a cover 14 (partially shown in simplified form in phantom line drawing in FIG. 2) coupled to the base 12 to collectively form the housing 4. The aperture 10 (shown in simplified form in hidden line drawing in FIG. 2) extends through the base 12. Among other molded features, the example insert 102 also includes a guide portion 120, which is structured to cooperate with the base 12 to accurately position the insert 102 and wires 300 proximate to the accessory 200 and aperture 10, as previously discussed. Such guide portion 120 and corresponding guide feature of the circuit breaker base 12 can be seen, for example, in FIGS. 4 and 5. More specifically, as best shown in the exploded views of FIGS. 4 and 5, the guide portion 120 of the example insert 102 comprises a molded flange 122 on a lateral edge of the elongated molded member 102 (see, for example, FIGS. 6 and 7). The circuit breaker base 12 includes a channel 50, which corresponds to the molded flange 122 such that the flange 122 is structured to be removably disposed in the channel 50. This will be further appreciated with reference to and comparison of the exploded views of FIGS. 4 and 5, and the assembled or installed views of FIGS. 1 and 3.

The insert 102 of the example accessory wire retention assembly 100 further includes a locking portion 130. Such locking portion 130 comprises a molded feature on the upper end of the insert 102, which is structured to cooperate with the circuit breaker cover 14, as shown in simplified form in phantom line drawing in FIG. 2. In the example showing and described herein, the locking feature comprises a molded protrusion 132 (best shown in FIGS. 5-7). More specifically, when the cover 14 (partially shown in simplified view in phantom line drawing in FIG. 2) is installed on the base 12, a portion of the cover 14 engages at least one corresponding portion (e.g., without limitation, protrusion 132) of the insert 102 to lock the insert 102 in the desired position within the aforementioned channel 50 of the circuit breaker base 12. Although, it will be appreciated that alternative locking features (not shown) or arrangements for cooperating with the cover 14 to lock the insert 102 in position are also contemplated by the disclosed concept.

The insert 102 further includes a thru hole 140 extending through the elongated molded member 102, as best shown in FIG. 7. The wires 300 are received through the thru hole 140 to establish the aforementioned desired predetermined position of the wires 300 with respect to the circuit breaker accessory 200 (see, for example, FIGS. 1-5). As previously noted, in the non-limiting example shown and described herein, the wires 300 are electrically connected to an electrical connector 302, which is at least partially disposed in the thru hole 140, as shown in FIGS. 1, 3, 5 and 6. As shown in FIG. 5, the example PCB 200 preferably includes a corresponding electrical connector 202, which is structured to be mechanically coupled and electrically connected to the electrical connector 302 of the accessory wires 300. The insert 102 of the accessory wire retention assembly 100 preferably includes a molded collar 142, which projects outwardly from the elongated molded member 102 at or about the thru hole 140, as best shown in FIG. 4. Such molded collar 142 functions to further align and secure the electrical connector 302 of the wires 300 in a predetermined desired orientation with respect to the electrical connector 202 of the PCB 200.

Accordingly, the disclosed accessory wire retention assembly 100 provides a removable insert 102, which advantageously accurately routes accessory wires 300 to provide clearance within the interior 6 of the circuit breaker housing 4, thereby reducing the risk of the accessory wires 300 interfering with internal moving mechanical parts of the circuit breaker 2. In addition to establishing consistent, accurate and reliable placement of customer wires 300 with respect to circuit breaker accessories 200, the accessory wire retention assembly 100 also maintains the wires 300 in the desired position and provides wire strain relief by transferring localized stress on the wires 300 to the circuit breaker housing (e.g., base 12).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An accessory wire retention assembly for an electrical switching apparatus, said electrical switching apparatus comprising a housing, separable contacts and an accessory enclosed by the housing, an operating mechanism for opening and closing said separable contacts, and a number of wires adapted to be electrically connected to said accessory, the housing including an interior, an exterior, and an aperture, said wires extending from the interior through said aperture to the exterior, said accessory wire retention assembly comprising:
    an insert structured to cooperate with the housing and to establish a predetermined position of said wires with respect to said accessory and said aperture; and
    a fastening mechanism structured to fasten said wires to said insert to maintain said wires in said predetermined position,
    wherein said insert is an elongated molded member comprising a number of molded features structured to cooperate with the housing, said wires, and said fastening mechanism, and
    wherein said housing further includes a base and a cover coupled to said base; wherein said aperture extends through said base; and wherein said number of molded features includes a guide portion structured to cooperate with said base to accurately position said insert and said wires proximate said accessary and said aperture.

2. The accessory wire retention assembly of claim 1 wherein said number of molded features includes a fastening portion for receiving said fastening mechanism and maintaining the position of said fastening mechanism.

3. The accessory wire retention assembly of claim 2 wherein said fastening portion comprises a number of notches formed in said elongated molded member; wherein said fastening mechanism is a wire tie; and wherein said wire tie is structured to wrap around said wires and be disposed in said number of molded notches to resist undesired movement of said wires.

4. The accessory wire retention assembly of claim 1 wherein said guide portion comprises a molded flange; wherein said base includes a channel corresponding to said molded flange; and wherein said flange is structured to be removably disposed in said channel.

5. The accessory wire retention assembly of claim 1 wherein said number of molded features further includes a locking portion; and wherein said locking portion is structured to cooperate with said cover to lock said insert in position when said cover is installed on said base.

6. The accessory wire retention assembly of claim 1 wherein said number of molded features includes a thru hole extending through said elongated molded member; and wherein said thru hole is structured to receive said wires and position said wires in said predetermined position with respect to said accessory.

7. The accessory wire retention assembly of claim 6 further comprising an electrical connector electrically connected to said wires; and wherein said electrical connector is at least partially disposed in said thru hole.

8. The accessory wire retention assembly of claim 7 wherein said accessory comprises a printed circuit board; wherein said printed circuit board includes an electrical connector structured to be mechanically coupled and electrically connected to said electrical connector of said wires; wherein said insert further comprises a molded collar projecting outwardly from said elongated molded member at or about said thru hole; and wherein said molded collar is structured to align and secure said electrical connector of said wires in a predetermined orientation with respect to said electrical connector of said printed circuit board.

9. An electrical switching apparatus comprising:
    a housing including an interior, an exterior, and an aperture;
    separable contacts enclosed by the housing;
    an accessory enclosed by the housing;
    an operating mechanism for opening and closing said separable contacts;
    a number of wires adapted to be electrically connected to said accessory, said wires extending from the interior of the housing through said aperture to the exterior of the housing; and
    an accessory wire retention assembly comprising:
        an insert structured to cooperate with the housing and to establish a predetermined position of said wires with respect to said accessory and said aperture, and
        a fastening mechanism for fastening said wires to said insert to maintain said wires in said predetermined position,
        wherein said insert is an elongated molded member comprising a number of molded features structured to cooperate with the housing, said wires, and said fastening mechanism, and wherein said housing further includes a base and a cover coupled to said base; wherein said aperture extends through said base; and wherein said number of molded features includes a guide portion structured to cooperate with said base to accurately position said insert and said wires proximate said accessary and said aperture.

10. The electrical switching apparatus of claim 9 wherein said number of molded features includes a fastening portion for receiving said fastening mechanism and maintaining the position of said fastening mechanism.

11. The electrical switching apparatus of claim 10 wherein said fastening portion comprises a number of notches formed in said elongated molded member; wherein said fastening mechanism is a wire tie; and wherein said wire tie is structured to wrap around said wires and be disposed in said number of molded notches to resist undesired movement of said wires.

12. The electrical switching apparatus of claim 9 wherein said guide portion comprises a molded flange; wherein said base includes a channel corresponding to said molded flange; and wherein said flange is structured to be removably disposed in said channel.

13. The electrical switching apparatus of claim 9 wherein said number of molded features further includes a locking portion; and wherein said locking portion is structured to cooperate with said cover to lock said insert in position when said cover is installed on said base.

14. The electrical switching apparatus of claim 9 wherein said number of molded features includes a thru hole extending through said elongated molded member; and wherein said thru hole is structured to receive said wires and position said wires in said predetermined position with respect to said accessory.

15. The electrical switching apparatus of claim 14 further comprising an electrical connector electrically connected to said wires; and wherein said electrical connector is at least partially disposed in said thru hole.

16. The electrical switching apparatus of claim 15 wherein said accessory comprises a printed circuit board; wherein said printed circuit board includes an electrical connector structured to be mechanically coupled and electrically connected to said electrical connector of said wires; wherein said insert further comprises a molded collar projecting outwardly from said elongated molded member at or about said thru hole; and wherein said molded collar is structured to align and secure said electrical connector of said wires in a predetermined orientation with respect to said electrical connector of said printed circuit board.

* * * * *